United States Patent [19]

Bross et al.

[11] Patent Number: 5,326,245
[45] Date of Patent: Jul. 5, 1994

[54] APPARATUS FOR EXTRUDING MATERIALS THAT EXHIBIT ANISOTROPIC PROPERTIES DUE TO MOLECULAR OR FIBRIL ORIENTATION AS A RESULT OF THE EXTRUSION PROCESS

[75] Inventors: Arthur Bross; Thomas J. Walsh, both of Poughkeepsie; Thomas J. Walsh, III, Verbank, all of N.Y.

[73] Assignee: International Business Machines Corporation, Armonk, N.Y.

[21] Appl. No.: 904,754

[22] Filed: Jun. 26, 1992

[51] Int. Cl.5 .................... B29C 47/00; B44C 1/22; C23F 1/00
[52] U.S. Cl. .................... 425/131.1; 156/244.25; 156/656; 156/902; 264/177.16; 425/133.5
[58] Field of Search .................. 156/244.11, 244.13, 156/244.25; 425/131.1, 133.1, 133.5, DIG. 243; 264/176.1, 177.16, 209.2, 209.5, 210.1, 280

[56] References Cited

U.S. PATENT DOCUMENTS

| | | | |
|---|---|---|---|
| 2,354,243 | 1/1942 | Blake | 264/280 X |
| 3,256,560 | 6/1966 | Adomaitis | 264/108 |
| 3,631,017 | 12/1971 | Rettig et al. | 260/94.9 |
| 3,680,209 | 8/1972 | Hacke | 156/151 X |
| 4,420,451 | 12/1983 | Rasmussen | 264/173 |
| 4,447,599 | 5/1984 | Cogswell et al. | 523/502 |
| 4,450,131 | 5/1984 | Martinek | 264/209.2 |
| 4,489,671 | 12/1984 | Choinski | 118/412 |
| 4,496,413 | 1/1985 | Sharps, Jr. | 156/244.13 |
| 4,564,582 | 1/1986 | Miyazaki | 430/311 |
| 4,584,154 | 4/1986 | Cerny | 264/209.2 |
| 4,614,629 | 9/1986 | Economy et al. | 264/176.1 |
| 4,623,563 | 11/1986 | Noda et al. | 427/379 |
| 4,737,398 | 4/1988 | Ikenaga et al. | 428/216 |
| 4,789,511 | 12/1988 | Bilgin | 264/108 |
| 4,789,514 | 12/1988 | Lo | 264/280 |
| 4,820,549 | 4/1989 | Ozaki et al. | 427/98 |
| 4,839,232 | 6/1989 | Morita et al. | 428/473.5 |
| 4,851,173 | 7/1989 | Mackley et al. | 264/204 |
| 4,853,317 | 8/1989 | Hayes | 430/318 |
| 4,874,657 | 10/1989 | Lo et al. | 428/220 |
| 4,876,120 | 10/1989 | Belke et al. | 428/1 |
| 4,938,996 | 7/1990 | Ziv et al. | 427/53.1 |
| 4,939,235 | 7/1990 | Harvey et al. | 528/337 |
| 4,956,140 | 9/1990 | Rolles et al. | 264/280 |
| 4,963,428 | 10/1990 | Harvey et al. | 428/220 |
| 5,047,262 | 9/1991 | deVries et al. | 427/96 |

FOREIGN PATENT DOCUMENTS

| | | |
|---|---|---|
| 445401A | 9/1991 | European Pat. Off. |
| 0038458 | 4/1981 | Japan . |
| 3069634 | 3/1988 | Japan . |
| 1214096 | 8/1989 | Japan . |
| 0232034 | 9/1989 | Japan . |
| 2175773 | 7/1990 | Japan . |
| 02218194 | 8/1990 | Japan . |
| 03152943 | 6/1991 | Japan . |
| 1177831 | 1/1970 | United Kingdom . |

*Primary Examiner*—William A. Powell
*Attorney, Agent, or Firm*—Whitham & Marhoefer

[57] ABSTRACT

Extrusion method and apparatus in which the liquid precursor of the extruded material is forced through a die formed by two surfaces moving in opposite directions relative to one another and transversely to the direction of material flow. Immediately upon exiting this dynamic die, the extracted material is removed as a sheet or film through a take-off system. In a preferred embodiment of the invention, the first die is formed by members rotating on a common axis in opposite rotational directions.

9 Claims, 6 Drawing Sheets

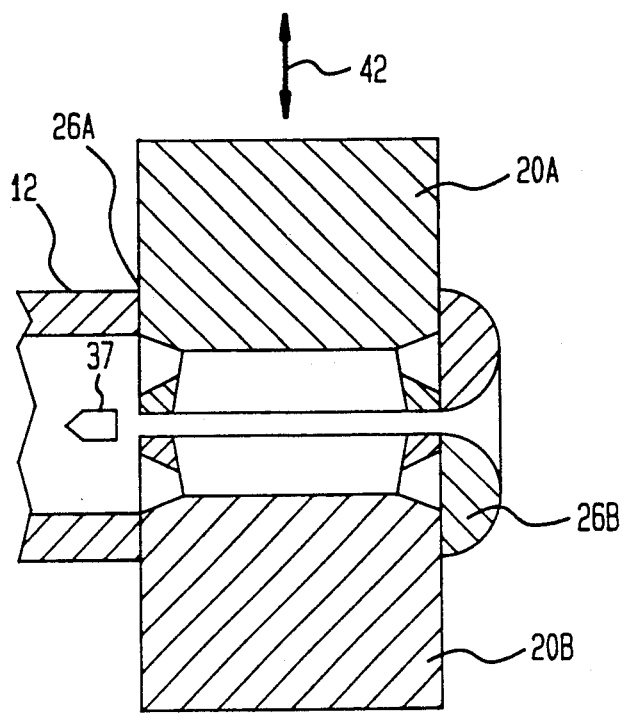
FIG. 10
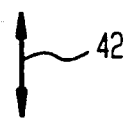
FIG. 1
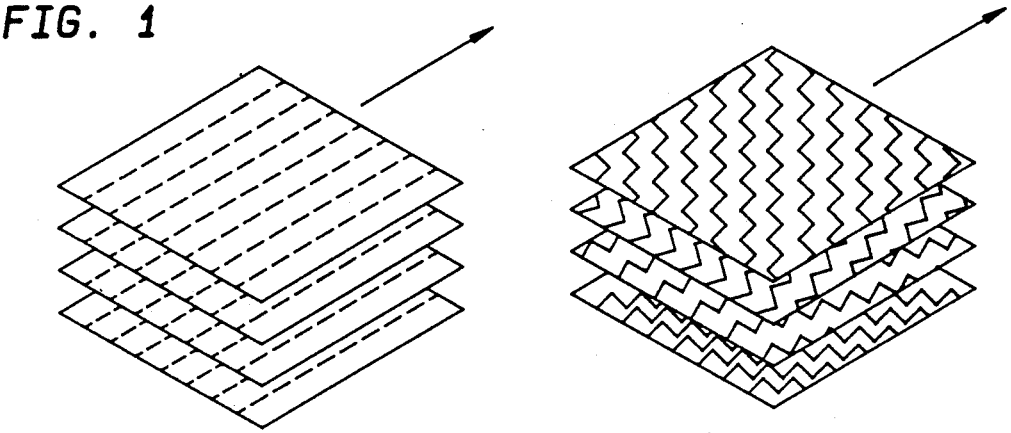
FIG. 9
FIG. 4

APPARATUS FOR EXTRUDING MATERIALS THAT EXHIBIT ANISOTROPIC PROPERTIES DUE TO MOLECULAR OR FIBRIL ORIENTATION AS A RESULT OF THE EXTRUSION PROCESS

CROSS REFERENCE TO RELATED APPLICATION

The disclosure of this application is related in subject matter to that of the following U.S. Application. Ser. No. 07/904,742 filed Jun. 26, 1992, by Arthur Bross et al., for "Method and Apparatus for Extruding Materials That Exhibit Anisotropic Properties By Means of Reciprocating Die Surfaces" which is assigned to the assignee of this application.

BACKGROUND OF THE INVENTION

1. Field of the Invention

This invention relates to a method and apparatus for extruding polymer, ceramic, composite, and other materials that exhibit anisotropic properties due to molecular or fibril orientation along a single axis as a result of the extrusion process. More particularly, the invention relates to an improved extrusion method and apparatus that provides a multi-axis orientation of molecules or fibrils in the extruded material.

2. Description of the Prior Art

Certain polymers (important examples are liquid crystal polymers), composites, and ceramics are comprised of molecules and/or fibrils that become more or less orientated along a single axis when extruded through fixed die openings. The resultant extruded films, sheets, or parts have physical thermal, chemical and electrical properties that are anisotropic; i.e., one value in the direction of orientation and another value in a direction perpendicular to the direction of orientation. FIG. 1 is a schematic view of a flat sheet extruded with a conventional die assembly. As illustrated by the dashed lines, elongated elements (e.g. fibrils in a liquid crystal polymer) are oriented in the flow direction (indicated by the arrow) through the die assembly.

The prior art has proposed applying a shearing force to the surfaces of the material in the liquid state as part of the extrusion process. This force produces a multi-axial orientation and a resultant extruded material that is less anisotropic than that produced with fixed extrusion dies. These proposals include the following U.S. patents.

U.S. Pat. No. 4,450,131 discloses a die assembly for extruding a liquid crystal polymer with two rotating cylindrical die members of different diameter which are situated coaxially;

U.S. Pat. No. 4,496,413 discloses a die assembly with a cylindrical tubular die member surrounding a solid counter-rotating core; and U.S. Pat. No. 4,420,451 discloses a method for film extrusion comprising rotary die parts. The die parts comprise different diameters and are arranged surrounding each other.

In these prior art devices the material is extruded in the form of a tube. To form a sheet material the tube has to be cut or folded upon itself, which is disadvantageous.

SUMMARY OF THE INVENTION

It is therefore an object of the present invention to provide an extrusion die assembly for continuously extruding a flat sheet of material containing elongated elements to produce a material with structural multi-axial orientation in sheet form.

Briefly, this invention contemplates the provision of an extrusion method and apparatus in which the liquid precursor of the extruded material is forced through a die formed by two surfaces moving in opposite directions relative to one another and transversely to the direction of material flow. Immediately upon exiting this dynamic die, the finally extruded material is removed. In a preferred embodiment of the invention, the first die is formed by two bowl shaped members rotating on a common axis in opposite rotational directions. A housing partially surrounds a gap between the two bowls so that material forced into the cavity formed by the two bowl shaped members can exit only through the die formed by the counter-rotating surfaces or rims in the region of the fixed die. In one alternate embodiment of the preferred embodiment, teeth are provided on the rims or surfaces of said bowl shaped members to provide form closure to move the material in a direction transverse to the flow direction. In another alternate embodiment, the width of said gap between the counter-rotating rims or surfaces is adjustable.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a schematic perspective view of layers of a material extruded with a conventional die assembly.

FIG. 4 is a schematic perspective view of layers of a material extruded with a die assembly according to the first or third embodiment of the invention.

FIG. 9 is a schematic perspective view of layers of a material extruded with a die assembly according to the second embodiment of the invention.

FIG. 10 is a cross-section of a die assembly according to a third embodiment of the invention.

DETAILED DESCRIPTION OF A PREFERRED EMBODIMENT OF THE INVENTION

Figure 2:
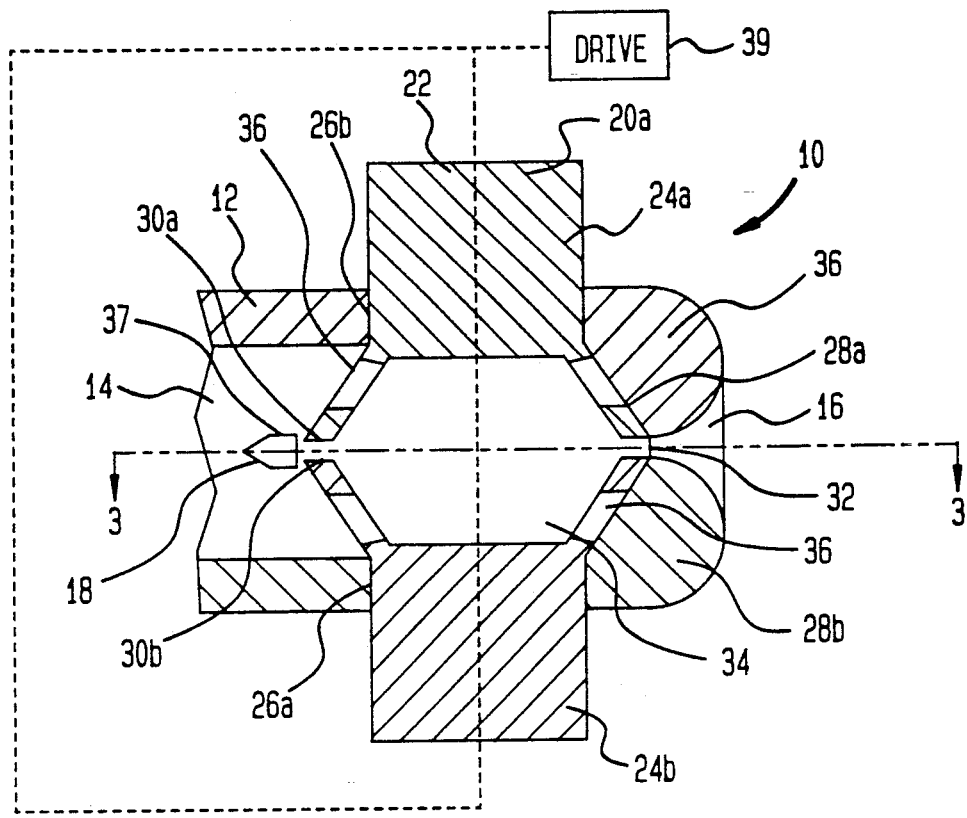
FIG. 2 is a cross-section of a die assembly according to a first embodiment of the invention.
Figure 3:
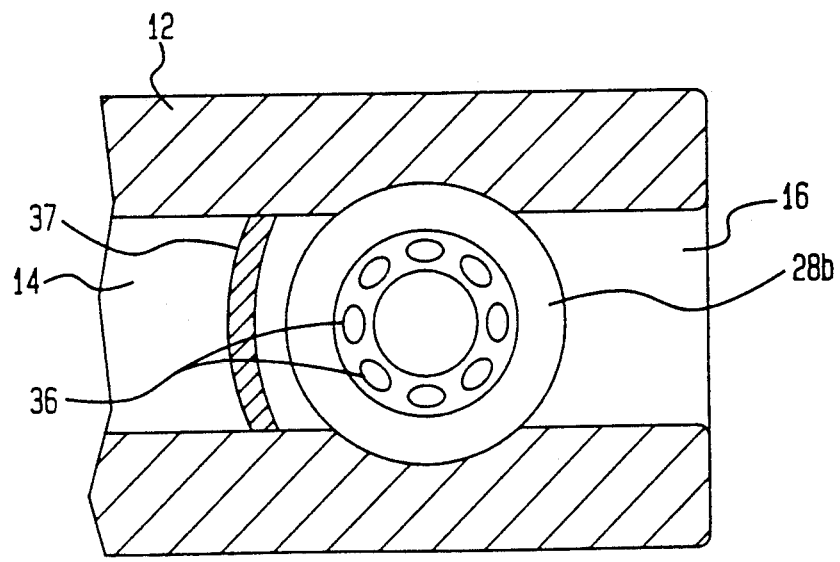
FIG. 3 is a cross-section of the die assembly of FIG. 2 along the line III—III in FIG. 2.

Referring now to the drawings, and more particularly to FIGS. 2 and 3, an extruding die assembly, in accordance with the teachings of this invention, is indicated by general reference numeral 10. In this assembly, housing 12 defines a passageway 14 along which the material to be extruded is forced by a screw feed or other suitable mechanism. The pressurized material is urged through a fixed rectangular throat opening 16, where it leaves the die assembly continuously in the form of a flat strip or sheet of extruded material. The material is extruded along the axis 18.

Disposed in the housing 12 are two rotatable mounted die members, 20A and 20B. Each of the die members within the housing has a generally conically shaped or bowl-shaped member, respectively, members 28A and 28B. Rims 30A and 30B of the members 28A and 28B form a die gap 32 through which the material is extruded. Preferably the die gap 32 is equal in width or smaller to the width of the throat opening 16, and the two gaps are disposed contiguously.

The conical members 28A and 28B, in combination, define a chamber 34. Material to be extruded from passageway 14 is forced into the chamber 34 through openings 36 in the wall of the members. Since these openings are counter-rotating, they tend to provide a mixing action to the material within the chamber, which in turn, tends to produce a more mixed and hence more isotropic melt. A conforming baffle 37 prevents material from entering the gap 32 on the upstream side and also directs the material towards the openings 36. Preferably the openings 36 are tapered from a larger diameter on the outer surface to a more restricted diameter on the inner surface, as shown in the drawings.

Shafts 24A and 24B mount the die members 20A and 20B rotatively in bearings 26A and 26B in the housing 12. A suitable drive means 39 rotates the members 20A and 20B respectively in opposite directions. The counter-rotating movement of the surfaces that form die gap 32 coupled with the mixing in the chamber, introduces opposing shearing forces at the upper and lower surfaces of the material being extruded. As indicated in FIG. 4, when shearing forces are applied to the upper and lower surfaces, the orientation of the molecules or fibrils change direction slightly from layer to layer due to the applied shearing forces. These shearing forces, which are transferred due to the viscosity of the semi-liquid material being extruded, results in extruded material sheet or film that is more nearly isotropic. Orientation of the chain-like molecules, or fibrils is preferably at an angle of approximately 45° to the extrusion direction at the upper and lower surfaces of the material. The orientation can be changed by altering the rotational speed at the die members, the flow velocity, the viscosity of the extruded material or by influencing the solidification process or by changing the combination of these parameters.

The shear forces induced into the material are also dependent onto roughness of the rims or die surfaces. The friction provided between the rotating surface and the material to be extruded is the greater the rougher the surface is.

Figure 5:
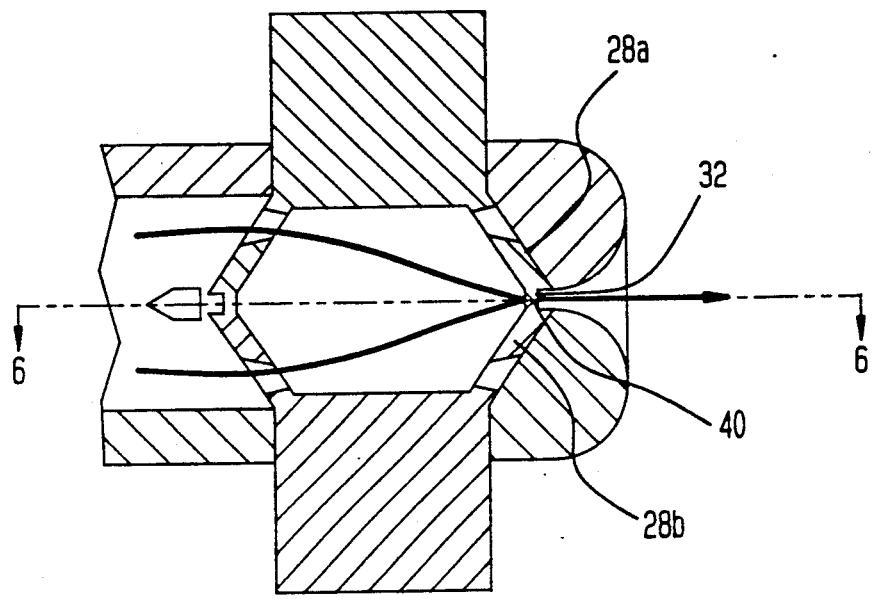
FIG. 5 is a cross-section of a die assembly according to a second embodiment of the invention.
Figure 6:
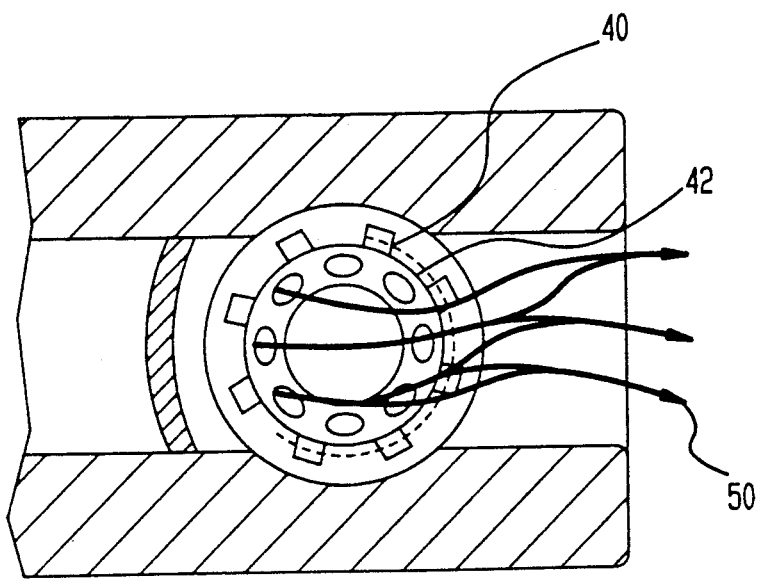
FIG. 6 is a cross-section of the die assembly of FIG. 5 along the line VI—VI in FIG. 5.
Figure 7:
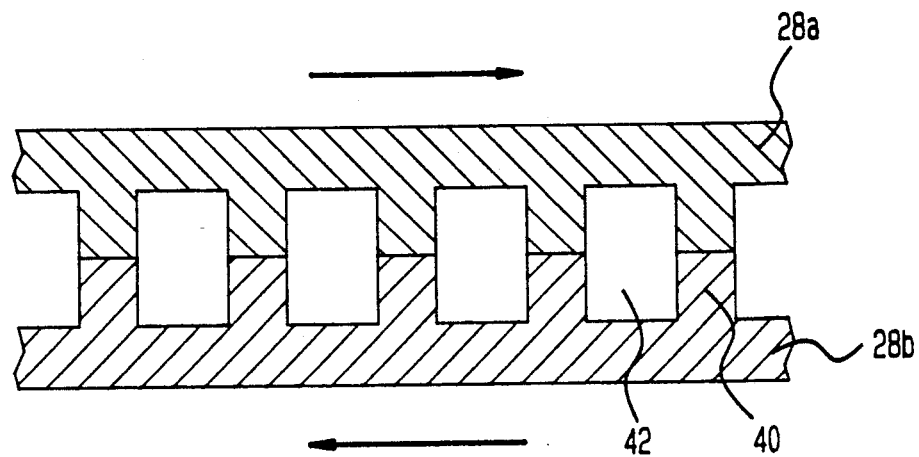
FIG. 7 is a developed view of a section of the die members along the dashed line in FIG. 3.
Figure 8:
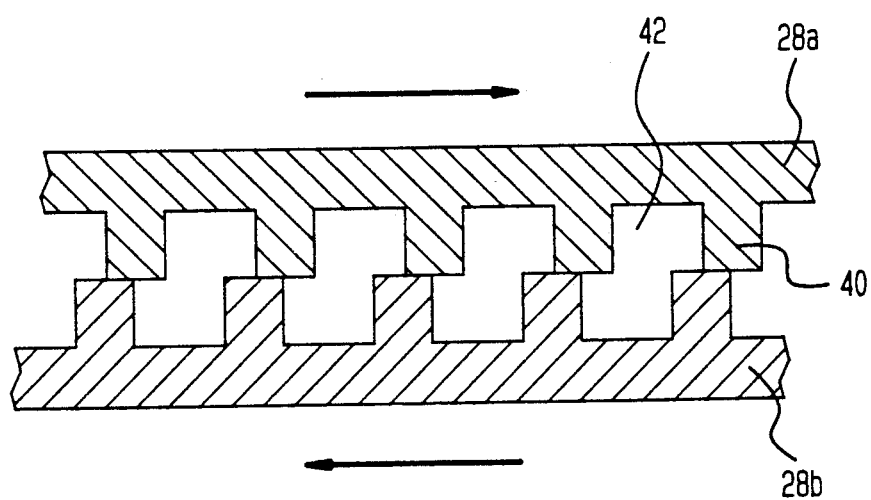
FIG. 8 shows the developed view according to FIG. 7 after relative movement of the die members.

FIGS. 5 and 6 show a different embodiment of the inventive die assembly. The annular surface or rim of the lower rotating die member has a number of teeth 40 protruding from the surface. The shear forces are partially induced into the material to be extruded via a form closure between teeth 40 and material situated in adjacent slots 42, thus enabling inducing of higher shear forces as compared to a friction transmission as described in the first embodiment of the invention. The flow of the material to be extruded through openings 36 and around teeth 40 through gap 32 and throat opening 16 is indicated by arrows 50. The shear forces induced to the extruded material alter, depending on the relative position of the upper and lower teeth as shown in FIG. 7 and 8. A sheet material with alternating structural orientation in each sliced plane or layer is produced, as shown in FIG. 9. The orientation of chain-molecules or fibrils in each layer follows a zig-zag pattern, the exact form of which being dependent on tooth breadth and depth, rotational speed of the die members, viscosity and flow velocity and other parameters.

FIG. 10 shows a different embodiment of the die members of FIG. 2. The outer form of the die members is a cylinder, thereby simplifying manufacturing of the die members and the bearing openings 26A and 26B in housing 12. Furthermore, it is feasible to move the die members along their axis in the direction of arrow 42 thereby altering the width of gap 32 between the die members. By adjusting the width of gap 32 it is possible to control the thickness of the extruded sheet material.

Figure 11:
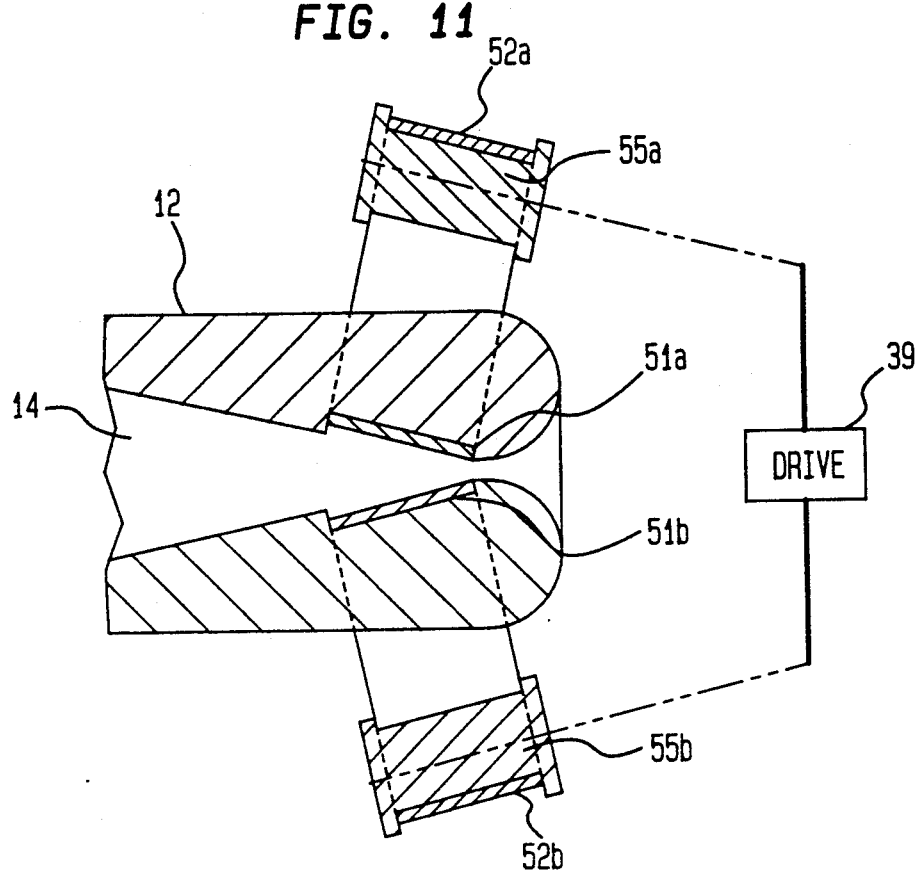
FIG. 11 is a cross-section of a die assembly according to a fourth embodiment of the invention.
Figure 12:
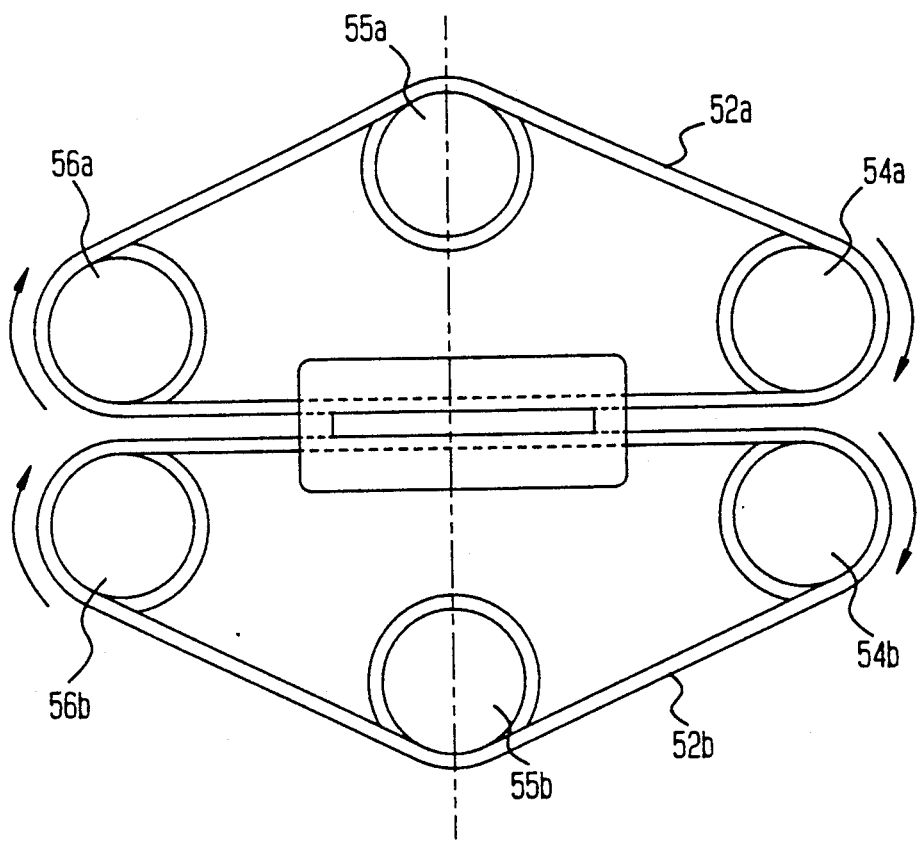
FIG. 12 is a front view of the die assembly of FIG. 11.

In FIGS. 11 and 12 a fourth embodiment of the inventive die assembly is shown. On the inner walls of the housing 12 defining the passageway for the material to be extruded two grooves 51A and 51B are provided, each receiving an endless belt 52A and 52B, respectively. Endless belts 52A and 52B are guided and tensed by pulleys 54A, 55A, 56A and 54B, 55B and 56B, respectively. Pulleys 55A and 55B are driven by a drive 39 in the same direction. Consequently the sections of the belts running through the walls of the passageway run in opposite directions, inducing opposing shearing forces at the upper and lower surfaces of the material being extruded. As indicated in FIG. 4, when shearing forces are applied to the upper and lower surfaces, the orientation of the molecules or fibrils change direction slightly from layer to layer due to the applied shearing forces. These shearing forces, which are transferred due to the viscosity of the semi-liquid material being extruded, results in extruded sheet or film material that acts as an isotropic sheet or film because of the crossed fibrils from top to bottom. Orientation of the chain-like molecules, or fibrils is preferably at an angle of approximately 45° to the extrusion direction at the upper and lower surfaces of the material. The orientation can be changed by altering the rotational speed at the die members, the flow velocity, the viscosity of the extruded material or by influencing the solidification process or by changing the combination of these parameters.

Figure 13:
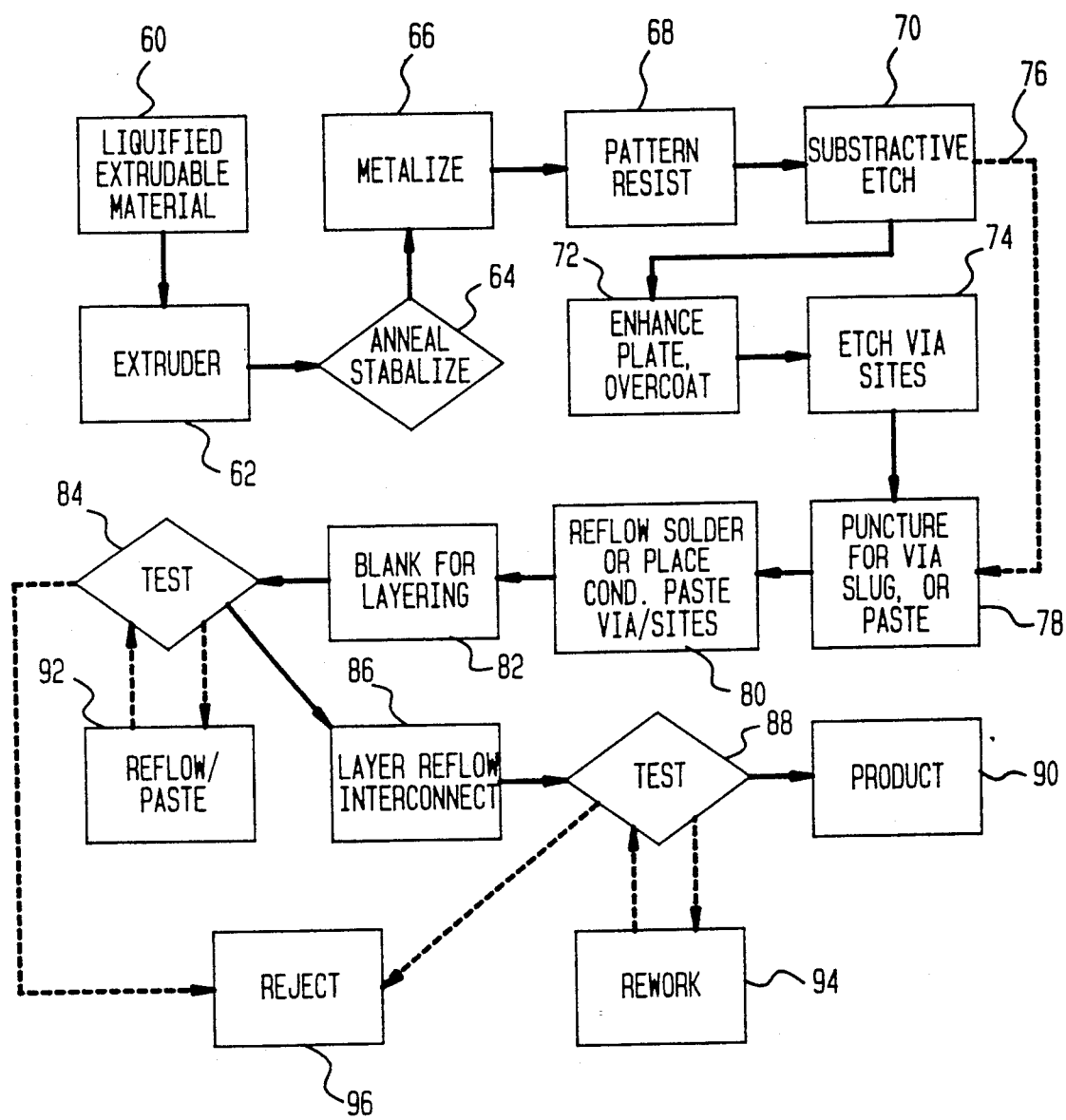
FIG. 13 is a scheme of a process using a die assembly according to the invention.

FIG. 13 describes a method which is useful for a line process for producing multi-layered products for electronic applications such as substrates, printed circuit cards, interposers, sockets, connectors or the like. The method uses an extrusion die assembly according to the invention.

In a first step 62, a liquified extrudable material, like liquid crystal polymer, is extruded using a extrusion die assembly 62, according to the invention. The extruded material is then annealed and stabilized in a step 64. In a step 66 the annealed sheet material is metallized, covering one or both sides of the sheet material with a metal layer. Known techniques such as plating, layering, vaporizing or sputtering can be used. In a step 68 a resist pattern is applied to the metallized layer using a known photoresist process, followed by subtractive etching in a step 70. The sheet will then be plated or coated for protection in a step 72. Via sites are etched in a step 74. The last two steps can be omitted. The process would then follow a dotted path 76 in FIG. 9.

In a step 78, via holes are punctured and vias with conductive slugs or other conductive media are inserted to connect different layers electrically. The next step 80 is a reflow of a eutectic solder surface or placement of metal paste at the via sites, followed by registered blanking to size for layering in step 82. The blanked sheets are tested in step 86 and layered sheets are interconnected via a reflow through an appropriate heat and pressure system. After another test step 88, an approved product is complete (step 90).

If test 84 or 88 is negative, a reflow/paste step, or a rework step 92 or 94, respectively, can be inserted, if the sheet is deemed reworkable. Otherwise the sheet is rejected in a step 96.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An apparatus for extruding a polymer, such as a liquid crystal polymer, a ceramic, or composite material that is comprised of molecules or fibrils that exhibit anisotropic properties due to molecular or fibril orientation along a single axis as result of the extrusion process, comprising in combination:
    a first die face comprising a circular peripheral rim of a first member rotatable mounted in a housing;
    a second die face comprising a circular peripheral rim of a second member rotatable mounted in said housing;
    said first and second members rotatable mounted in said housing with said first and second die faces mounted in opposition to one another forming a die gap and said first and second members forming in combination a cavity;
    a passage in said housing for introducing a material to be extruded into said cavity through openings in said first and second members;
    said housing surrounding said gap so that extruded material exits only along an arc through a throat opening in said housing; and
    means for rotating said first member in one direction and said second member in an opposite direction.

2. The apparatus of claim 1, wherein said members are cone shaped.

3. An apparatus as in claim 1, wherein said members respectively are hollow cylinders.

4. An apparatus as in claim 1, wherein material to be extruded is mixed in said cavity.

5. An apparatus as in claim 1, wherein each of said members is movable relatively to said housing along its rotational axis.

6. An apparatus as in claim 1, wherein at least one of said die faces has a plurality of radially arranged slots.

7. An apparatus for extruding a polymer, such as a liquid crystal polymer, a ceramic, or composite material that is comprised of molecules or fibrils that exhibit anisotropic properties due to molecular or fibril orientation along a single axis as a result of the extrusion process, comprising in combination:
    a housing defining a passageway for the material to be extruded,
    said passageway having a section leading to a throat opening,
    said section directing the flow of the material to be extruded along a flow axis;
    two movable die members, said die members being movable in a linear translational movement perpendicularly to said flow axis;
    said two movable die members each having respective facing surfaces forming an extrusion gap; and
    means for moving said movable die members in respectively opposite directions.

8. An apparatus for extruding a polymer as in claim 7, wherein said facing surfaces forming an extrusion gap form a tapering section.

9. An apparatus for extruding a polymer as in claim 7, wherein said movable two die members are endless belts.

* * * * *